April 21, 1942. L. J. STEVENS Re. 22,079

BUSHING

Original Filed Sept. 6, 1939

Inventor

Leland J. Stevens

By Ernest L. Mechlin

Attorney

Reissued Apr. 21, 1942

Re. 22,079

UNITED STATES PATENT OFFICE 22,079

BUSHING

Leland J. Stevens, Baltimore, Md., assignor to Locke Insulator Corporation, Baltimore, Md., a corporation of Maryland Original No. 2,230,194, dated January 28, 1941, Serial No. 293,649, September 6, 1939. Application for reissue August 29, 1941, Serial No. 408,906

6 Claims. (Cl. 174—167)

The invention relates to bushings and more particularly to means for connecting thereto metallic caps and/or connectors generally used with bushings for transformers and the like.

The principal object of the invention, generally stated, is to provide a bushing cap which may be so connected to a bushing as to provide a fluid and gas tight joint therebetween, said joint serving to prevent leakage from or into said bushing.

Another object of the invention is to provide a simple form of bushing which may be connected to the electrical apparatus for which it is designed in any one of a number of ways and which is provided with a cap sealing the interior of said bushing, said cap having formed therein an opening, the side edges of which are adapted to cooperate with the electrical connector for maintaining the same against rotation with respect of both cap and bushing.

A still further object of the invention is to provide a simple, strong and inexpensive means for rigidly and permanently securing a metallic cap to a bushing, said means being adapted to prevent relative rotation between the cap and bushing.

Other objects of the invention will appear from the detailed description thereof, especially when taken in connection with the accompanying drawing in which, Figure 1 is an elevational view partially in section, illustrating a bushing and means for clamping the same to the transformer or other electrical apparatus.

Throughout the specification and drawing like parts are designated by like reference characters.

Figure 1:
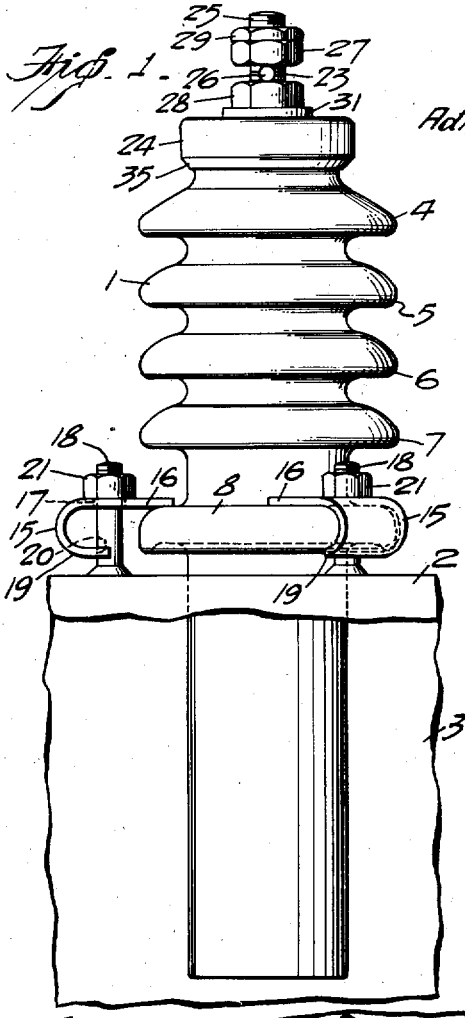
Figure 2:
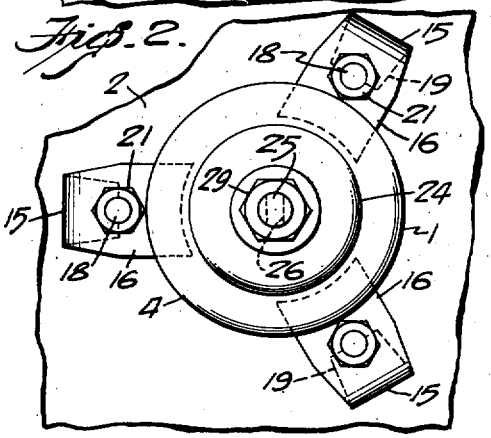
Figure 2 is a top plan view of the structure shown in Figure 1.

Before describing the preferred embodiment of the invention which I have illustrated, it is believed it will lead to a better understanding of the invention to describe the general conditions now existing in this particular branch of the electrical art.

Manufacturers of electrical apparatus such as transformers using entrance or lead-in bushings generally provide their own characteristic means for connecting the bushing to the apparatus. This practice necessitates the bushing manufacturers providing a large number of alternate styles of bushings so as to provide a bushing which will cooperate with the different types of fastening or securing means utilized by the bushing manufacturers. The result has been that the bushing manufacturers are required to keep in stock various styles of bushings or to keep in stock molds from which these bushings of different styles may be manufactured. It has been found, however, that by changing the external shape of the bushing to the form illustrated in the accompanying drawing it is possible to use a single style of bushing with a number of different makes of transformers.

The problem outlined above is only one of the problems which the insulator or bushing manufacturer has to face in connection with the production of these bushings. It is of course essential that the connection between the line conductor and the lead-in conductor or electrical connector be rigidly maintained in respect of the bushing and its cap and that the connection between the line conductor and/or the electrical connector carried by the bushing be maintained against rotation in respect of the bushing at the time of connection and during the subsequent use of the apparatus. It has therefore been customary either to counter-bore the bushing and/or to provide the same with a key-way so that the metallic connector, when inserted in the bushing, would cooperate with the shaped portion of the recess or the key-way so as to be maintained against rotation with respect of the bushing. It is exceedingly difficult and expensive to counterbore or to cut key-ways in the clay since these operations can be performed only after the clay has arrived at either the leather or bone dry state and such manipulation of clay in the leather or bone dry state is apt to cause incipient cracks which do not show until after the piece has been finished or fired.

Referring now to the embodiment of the invention, the numeral 1 designates generally a lead-in or entrance bushing adapted to be rigidly connected to a portion of the housing 2 of a transformer or other electrical apparatus 3. This type of bushing is preferably produced by the extrusion process, the clay from the pug mill being forced through the nozzle of the pug mill and formed into a hollow column or pipe, the maximum diameter of which is slightly greater than the maximum diameter of the finished bushing measured over the petticoat 4. After the clay has been formed as a hollow column and allowed to dry it is placed in a lathe or other machine and the petticoats 4, 5, 6 and 7, as well as the flange 8 and the head 9, are turned thereon. It will be understood that the number of petticoats may be altered as desired and that if desired the opposite end of the bushing may also be formed with a head similar to the head 9. The flange 8 is undercut, as at 10, to form a downwardly facing recess 11 into which a washer 12 is adapted to fit, the washer in turn resting, when the parts are in assembled position, upon a flange 13 formed around the opening 14 in the transformer housing. I have illustrated the bushing as being connected to the transformer by a plurality of J clips 15, each of which is provided in the leg 16 with an opening 17 through which the bolt 18 is adapted to project. The other leg 19 of each clip is provided with a notch 20 adapted to embrace the adjacent side of the bolt 18, the leg 16 of the clip being adapted to overlie the flange 8 and the clips are maintained in tight engagement with the flange by means of the nuts 21 which are screw-threadedly connected to the bolts 18. It will thus be seen that by applying pressure to the clips 15 the washer or gasket 12 is forced into tight and intimate contact with the flange 8 of the bushing and flange 13 of the transformer housing forming a leak-proof connection between the bushing and the transformer.

The head 9 is provided at its lower portion with an undercut shoulder 22, the purpose and object of which will be hereinafter described. In the event that a metallic connector such as 23 is to be employed the same is adapted to extend through a metal cap 24 and is provided at its upper end with a threaded portion 25 having an opening 26 therein into which the line conductor is adapted to extend and by which the conductor is secured to the connector by means of the nuts 27 and 28 and the lock nut 29. Slidably received on the connector 23 between the shoulder portion 30 and the nut 28 and adapted to overlie the cap 24 is a metallic washer 31, the latter being adapted to house a composition washer 32, the latter preferably being formed of felt or like material.

Figure 3:
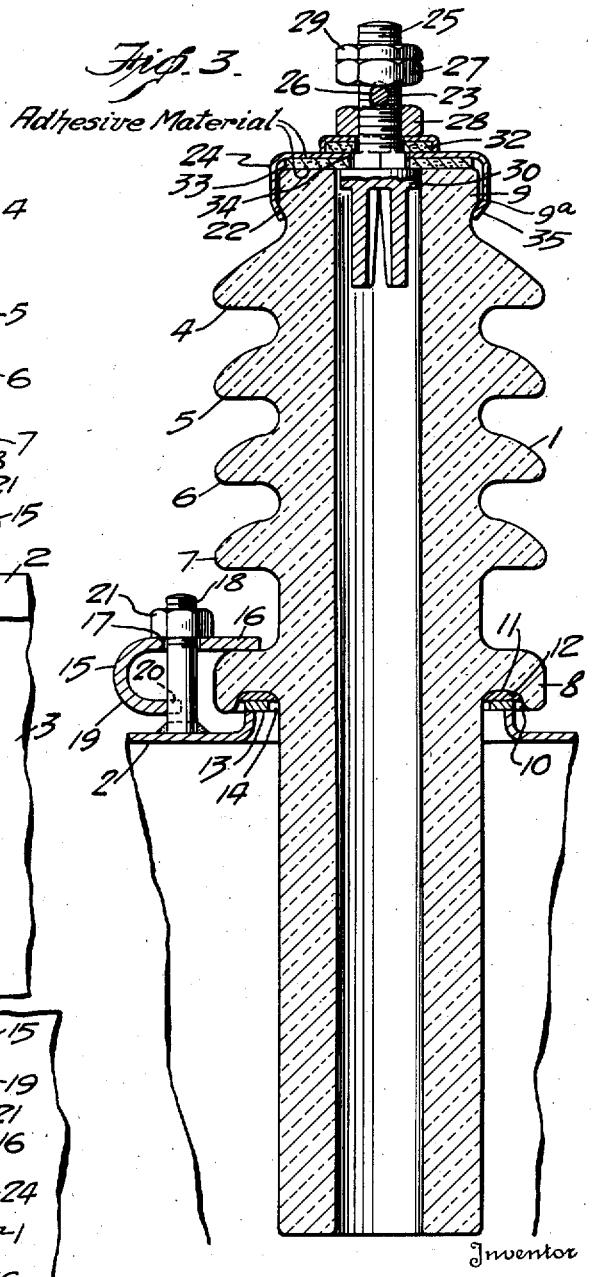
Figure 3 is a central vertical section of Figure 1.

It will be understood from the drawing, particularly Figure 3, that interposed between the cap 24, and the upper end of the bushing 9 I provide another washer 33 preferably of compressible material such as cork, rubber, felt or the like. The opening 34 in the cap 24 is non-circular in outline and is adapted to fit the adjacent portion of the connector 23 so as to maintain the cap and connector against relative rotation when the parts are in fully assembled position. The head 9 of the bushing is provided with a roughened surface 9a which can be produced in any one of a number of ways, the simple method being to provide a sanded surface which, during the firing of the bushing becomes firmly attached to the underlying surface of the bushing head. This roughened surface of the head, the inner surface of the cap and the washer 33 are coated with red Glyptol or other suitable lacquer, shellac or varnish as desired. The parts are then assembled and pressure is applied to the cap until the washer 33 is compressed to substantially one-half its original thickness. When the parts are maintained in this position the downwardly extending flange 35 of the cap 24 is then rolled or crimped so as to cause the inner surface to engage the undercut shoulder 22 of the head. Pressure is then released and the expansion of the washer forces the shoulder formed on the flange 35 against the shoulder 22 so as to provide an exceedingly tight joint and as soon as the Glyptol, shellac or varnish has dried or set the cap is maintained in fixed position with reference to the bushing by a connection which requires practically destructive effort to break.

By utilizing a washer of the composition named or one of similar material it is possible to provide both a fluid and gas tight joint between the cap and its associated parts and the bushing. The joint between the shoulder 22 and the flange 35 is rolled tightly initially and on release of the external force the washer forces the adjacent faces into tight engagement, and in this position the parts are sealed by the setting or hardening of the varnish or other compound. In the event the cap is perforated for the reception of the stem 23 I have found that the compressed washer will flow so as to embrace the said stem and form a gas and fluid tight joint.

The washer 32 serves to prevent the entry of moisture into the bushing and the bushing is now finished and ready for connection to a transformer or other electrical apparatus.

I claim:

1. In combination with a bushing having a bulbous head, the lower inclined underlying surface of said head being roughened, of a metallic cap provided with a deformable skirt portion adapted to fit over said head, a compressible composition washer adapted to fit between the top of said cap and the upper surface of said head, means for adhesively securing together said head, washer and cap, said means comprising a lacquer, and means for connecting said cap and bushing, said last named means comprising the deformable skirt portion, said means serving to maintain said washer under compression, said washer also serving to maintain direct contact between said deformable portion of said skirt and said inclined surface of said bushing.

2. An entrance bushing for transformers and the like wherein the bushing is exteriorly formed with an undercut head having an outwardly inclined underlying surface, and a plurality of spaced petticoats positioned below said surface, said bushing being interiorly formed with a longitudinal bore, the combination of a single piece cap having the top aperture in alinement with said bore, a deformable peripheral flange depending from said top portion and adapted to be directly engaged with the outwardly inclined surface of said head, a compressed resilient washer interposed between said top portion and the adjacent surface of said head and forming a seal at the upper surface of said head, means for adhesively securing together said head, washer and cap, said washer being apertured in alinement with said cap aperture, a metallic connector having an inner portion within said bore, and a stem projecting through said cap and washer apertures, a flange on said connector underlying the adjacent portion of said washer, and removable means associated with said stem for drawing said connector upwardly to bring said flange and washer into engagement, the non-circular portion of said connector entering a like opening in said cap for maintaining said connector in a fixed non-rotatable position when the parts are assembled.

3. An entrance bushing for transformers and the like wherein the bushing is exteriorly formed with an undercut head and a longitudinal bore, the combination of a cap, portions of which interlockingly engage with the undercut portion of said head, said cap having a non-circular opening therein, a compressible resilient washer having a centrally disposed opening therein interposed between said cap and the upper surface of said head, means for adhesively securing together said head, washer and cap, said washer forming a seal, said washer also serving to maintain said interlocking portions of said cap in engagement with said head, a metallic connector provided with an inner portion positioned within said bore, said portion having a non-circular portion, and a stem extending through said apertures in said cap and washer, and means movably associated with said connector stem for drawing the same upwardly to engage said portion within the non-circular opening in said cap for preventing rotation of said connector when the parts are assembled.

4. An entrance bushing for transformers and the like wherein the bushing is exteriorly formed with a head adjacent one extremity thereof, the surface of said head forming the base of a truncated cone-shaped portion of said bushing, the latter also having a central longitudinal bore, the combination of a cap having a deformable skirt portion and a top portion, the latter being provided with an aperture therein, said top being spaced from the upper surface of said head, an apertured resilient washer interposed between said apertured top portion and said last named surface, said deformable skirt portion being adapted to directly interlock with said cone-shaped surface to retain said resilient washer under a predetermined compression, a metallic connector having the inner portion thereof positioned within said bore and having portions bearing against said resilient washer, said connector having its stem extending through said cap and washer apertures, resilient means surrounding said stem and positioned above said cap, and means rotatably associated with said connector stem for maintaining said connector in engagement with said washer and said resilient means in engagement with said cap.

5. The combination with a bushing generally circular in cross section, said bushing having a portion of increased diameter, a flat face connecting the periphery of said portion with the body of the bushing, a metallic member embracingly engaging said portion, said member being provided with a flat portion positioned adjacent said face and being further provided with a deformable skirt portion positioned substantially at right angles to the plane of said flat face, a compressible elastic washer interposed between the face of said enlarged portion and the adjacent corresponding portion of said member, the opposite end of said enlarged portion being connected to the body of the bushing by an inclined surface of revolution spaced from said first named face, means for adhesively securing said face, washer and metallic member, and additional means for connecting said metallic member and bushing against separation, said means comprising the deformable skirt portion, said means when deformed engaging said inclined surface and serving to maintain said washer under compression, the elasticity of said washer also serving to maintain a direct contact between the deformed portion of said skirt and said inclined surface.

6. The combination with a bushing generally circular in cross section, said bushing having a portion of increased diameter, the periphery of one end of said enlarged portion being joined to the body of the bushing by a face disposed at right angles to the longitudinal axis of the bushing, a metallic member having a flat base, a skirt projecting from said base and forming therewith a cup, the diameter of said cup being slightly greater than the diameter of the enlarged portion of said bushing, an inclined wall formed as a surface of revolution connecting the opposite end of said enlarged portion with the body of said bushing, said metallic cup being adapted to embrace said enlarged portion of said bushing, a washer interposed between the base of said cup and said face of said bushing, means for adhesively securing the opposite faces of said washer to said bushing and to the base of said cup, and means for maintaining said washer under compression and for connecting said cup and bushing against separation, said means comprising deforming the free edge of said cup to cause all portions thereof to engage with adjacent portions of said inclined wall of the enlarged portion of the bushing.

LELAND J. STEVENS.